United States Patent [19]

Shimizu et al.

[11] 4,130,704
[45] * Dec. 19, 1978

[54] PROCESS FOR PRODUCING SULFUR MODIFIED POLYCHLOROPRENE IN THE PRESENCE OF QUATERNARY AMMONIUM SALTS

[75] Inventors: Akihiko Shimizu; Atsushi Kita, both of Shin-nanyo, Japan

[73] Assignee: Toyo Soda Manufacturing Co., Ltd., Yamaguchi, Japan

[*] Notice: The portion of the term of this patent subsequent to Feb. 28, 1995, has been disclaimed.

[21] Appl. No.: 784,512

[22] Filed: Apr. 4, 1977

Related U.S. Application Data

[63] Continuation of Ser. No. 601,997, Aug. 5, 1975, Pat. No. 4,076,927.

[30] Foreign Application Priority Data

Aug. 6, 1974 [JP] Japan .................................. 49-89497

[51] Int. Cl.² ........................ C08F 2/28; C08F 136/18
[52] U.S. Cl. .................................. 526/217; 526/204; 526/295
[58] Field of Search ................... 260/29.7 N; 526/204, 526/217, 295

[56] References Cited

U.S. PATENT DOCUMENTS

| | | | |
|---|---|---|---|
| 2,234,215 | 3/1941 | Youker | 260/79.5 R |
| 2,264,173 | 11/1941 | Collins | 526/295 |
| 3,766,121 | 10/1973 | Fichteman | 260/29.7 |
| 3,808,183 | 4/1974 | Branlard | 526/295 |
| 3,904,590 | 9/1975 | Logothetis | 260/79.3 R |

FOREIGN PATENT DOCUMENTS

529838 11/1940 United Kingdom ............... 260/29.7 N

*Primary Examiner*—C. A. Henderson
*Attorney, Agent, or Firm*—Oblon, Fisher, Spivak, McClelland & Maier

[57] ABSTRACT

A sulfur modified polychloroprene is produced in a process which comprises polymerizing chloroprene or a mixture of chloroprene and a comonomer in a neutral or acidic aqueous emulsion by using a cationic emulsifier in the presence of sulfur and a peroxide initiator, and then performing a peptization of the resulting sulfur modified polychloroprene latex by addition thereto of an alkaline aqueous solution in amounts sufficient to reduce the pH of the latex to alkaline conditions.

7 Claims, 1 Drawing Figure

PEPTIZATION OF SULFUR MODIFIED POLYCHLOROPRENE LATEX

* POINT AT WHICH AN AQUEOUS SOLUTION OF HC WAS ADDED TO ADJUST THE pH TO 5

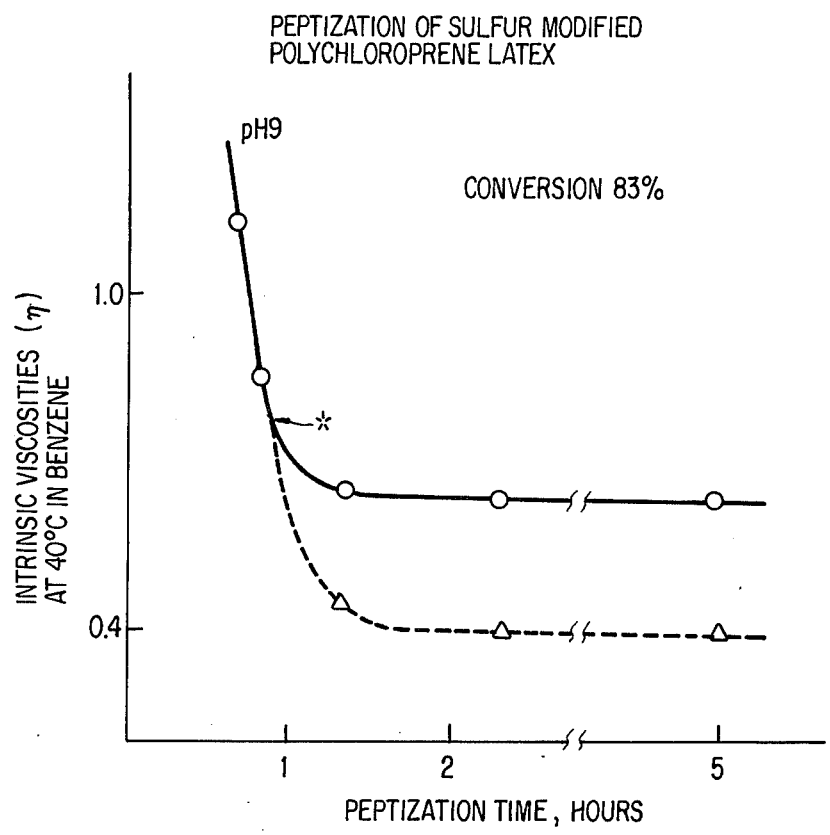

4,130,704

PROCESS FOR PRODUCING SULFUR MODIFIED POLYCHLOROPRENE IN THE PRESENCE OF QUATERNARY AMMONIUM SALTS

This is a continuation of application Ser. No. 601,997, filed Aug. 5, 1975 now U.S. Pat. No. 4,076,927.

BACKGROUND OF THE INVENTION

1. Field of the Invention

The present invention relates to a process for producing a sulfur modified polychloroprene.

2. Detailed Description of the Prior Art

Heretofore, a solvent soluble sulfur modified polychloroprene has been produced by polymerizing chloroprene in an aqueous emulsion by using a peroxide catalyst in the presence of sulfur and then peptizing the resulting polymer by adding a sulfur-containing organic peptizing agent such as tetraalkylthiuramdisulfide and dialkyldithiocarbamate and the like. However, in this process, since sulfur-containing organic peptizing agents such as tetraalkylthiuramdisulfide have been used, it has been difficult to completely terminate the peptization at a desired level. Accordingly, the Mooney viscosity of the latex and also the solid rubber content of the product disadvantageously varies in the storage of the product. It is known that the storage stability of the latex can be improved by including an alkali bisulfide or persulfate in the peptization using the sulfur-containing organic peptizing agent. It is also known that a sulfur modified polychloroprene having storage stability can be produced by polymerizing chloroprene or a mixture of chloroprene and a small amount of a comonomer in an aqueous emulsion in the presence of 0.01–2 wt. % of sulfur and 0.01–1.5 wt. % of dialkylxanthogendisulfide. However, the product of this process is not fully satisfactory. Consequently, there is a need for an improved process for preparing a sulfur modified polychloroprene.

SUMMARY OF THE INVENTION

Accordingly, it is an object of this invention to provide a novel process for producing a sulfur modified polychloroprene which is free from the disadvantages of the conventional processes and which produces a product having very high storage stability.

This and other objects of this invention, as will hereinafter become clear by the ensuing discussion, have been attained by providing a process for producing a solvent soluble sulfur modified polychloroprene which comprises polymerizing chloroprene in a neutral or acidic aqueous emulsion by using a cationic emulsifier in the presence of sulfur and a peroxide initiator and then performing a peptization of the resulting sulfur modified polychloroprene latex by addition thereto of an alkali aqueous solution to produce an alkaline pH.

BRIEF DESCRIPTION OF THE DRAWING

A more complete appreciation of the invention and many of the attendant advantages thereof will be readily attained as the same becomes better understood by reference to the following detailed description when considered in connection with the accompanying drawing, wherein:

The FIG. illustrates the effect of producing an acidic pH in the reaction mixture.

DESCRIPTION OF THE PREFERRED EMBODIMENTS

In the process of this invention, inhibition of polymerization, which is significant in the conventional alkaline emulsion polymerization technique, is quite low and the polymerization is performed smoothly by using only a small amount of an initiator. Furthermore, the peptization is spontaneously effected simply by addition of an alkaline aqueous solution to the latex after the polymerization so as to yield an alkaline pH. Moreover, the peptization can be immediately terminated by adding an acidic aqueous solution of a mineral acid or an organic acid, such as hydrochloric acid, acetic acid and the like, to produce an acidic pH. Also, in accordance with the process of this invention, a sulfur-containing organic peptizing agent, such as tetraalkylthiuramdisulfide, is not required in contradistinction to the conventional process where it is required. Accordingly, a sulfur modified polychloroprene having high storage stability is produced. Of course, it is still possible to attain the desired result by conducting the peptization with a small amount of a sulfur-containing organic peptizing agent.

The term "sulfur modified polychloroprene" used in the specification includes a homopolymer of chloroprene and also copolymers of chloroprene and a comonomer such as styrene, methyl methacrylate, butadiene, 2,3-dichlorobutadiene and the like, which are polymerized in the presence of sulfur.

A characteristic feature of the invention is the use of a cationic emulsifier as the emulsifier for the production of the sulfur modified polychloroprene. The advantageous results of this invention are not produced when the polymerization is effected using an anionic or nonionic emulsifier.

Suitable cationic emulsifiers for use in the polymerization include commercially available cationic emulsifiers such as ampholytic quarternary ammonium salts such as alkylallyl benzyl trimethyl ammonium chlorides, alkyl trimethylammonium bromides and alkyl pyridinium chloride and the like. It is also possible to include small amounts of other emulsifiers such as nonionic emulsifiers. The amount of emulsifier is usually up to 5 wt. % of the total weight of solution, but is not critical.

The amount of sulfur to be used in the polymerization should be in the range of 0.25–10.0 wt. % relative to the total weight of the monomer and is chosen depending upon the desired molecular weight in the resultant product.

Suitable initiators include organic peroxides, inorganic peroxides, azo compounds or redox type catalysts, such as benzoyl peroxide, potassium persulfate, cumene hydroperoxide, $\alpha,\alpha$-azobis-isobutyronitrile, t-butyl hydroperoxide and mixtures thereof. The amount of the initiator should be in the range of 0.01–2.0 wt. % relative to the total weight of the monomer.

The peptization of the latex can be conducted by adding an alkaline aqueous solution to yield an alkaline pH for the reactant solution. Suitable alkaline aqueous solutions for use in this invention include aqueous solutions of alkali metal compounds, such as sodium hydroxide and potassium hydroxide, and ammonia. The amount of the alkali should be the minimum amount required to produce a pH of higher than 8, preferably higher than 9. The amount of the alkali is usually in the range of 1–50 wt. %, preferably 5–20 wt. %, relative to the amount of the latex. The temperature for the peptization is preferably in the range of 10°–50° C.

The concentrations of both the alkaline and acidic aqueous solutions used in this invention are not critical, but concentrations of 10 wt. % are appropriate. Similarly, the molecular weight of the resultant polymer is not critical and can be chosen using conventional considerations according to the properties desired for the product.

Having generally described the invention, a more complete understanding can be obtained by reference to certain specific Examples, which are provided for purposes of illustration only and are not intended to be limiting unless otherwise specified. In the Examples, the term "part" indicates part by weight.

EXAMPLE 1

The monomer and other additives stated in Table 1 were charged into a reactor. The reaction system was purged with nitrogen gas and was maintained at 40° C. The polymerization was initiated by adding dropwise t-butyl hydroperoxide. When the conversion of the monomer reached 85%, the polymerization was terminated by adding the terminating composition of Table 2 to the latex.

TABLE 1

|  | Monomer Emulsion parts |
|---|---|
| Chloroprene monomer | 100 |
| Sulfur | 0.55 |
| Emulsifier (alkylallyl benzyl trimethyl ammonium chloride) | 4 |
| Water | 120 |
| Acetic acid | 0.5 |
| Condensates of formaldehyde-sodium naphthalene sulfonate | 0.7 |

TABLE 2

|  | Terminating Composition Parts |
|---|---|
| 4-t-butyl catechol | 0.005 |
| Phenothiazine | 0.005 |
| Chloroprene monomer | 1.0 |
| Sodium laurylsulfate | 0.2 |
| Water | 1.0 |

A 10% aqueous solution of sodium hydroxide was added to the latex to give an alkaline pH (pH = 9) and the mixture was maintained at 40° C. for 5 hours for aging to perform the peptization. An aqueous solution of hydrochloric acid was added to the latex after the peptization, to give an acidic pH (pH = 5) and the antioxidant composition of Table 3 was added to the latex. The unreacted monomer was removed by steam stripping under a reduced pressure and the polymer component was coagulated by conventional freeze coagulation. It was washed with water and was dried to obtain a rubber polymer which had a molecular weight of 330,000.

TABLE 3

|  | Antioxidant Composition Parts |
|---|---|
| 2,6-di-t-butyl-4-methylphenol | 0.5 |
| Phenothiazine | 0.01 |
| Chloroprene monomer | 2.75 |
| Sodium dodecylbenzene sulfonate | 0.07 |
| Water | 4.7 |

EXAMPLE 2

The monomer and the additives of Example 1 were charged into the reaction and the polymerization was conducted in accordance with the process of Example 1 to obtain a sulfur modified polychloroprene latex in a conversion of 84%. The polymerization time was 4 hours and 20 minutes and the gel percent before peptization was 98.0%. A 10% aqueous solution of sodium hydroxide was added dropwise to the latex to give an alkaline pH (pH = 10). Then, an emulsion containing 0.5 part of tetraethyl thiuramdisulfide was added to the latex and the mixture was kept at 40° C. during 5 hours for aging to perform the peptization. Said emulsion was prepared by emulsifying a mixture of 0.5 part of tetraethyl thiuramdisulfide, 5.0 part of chloroprene, 0.25 part of sodium laurylsulfate and 10.0 parts of water. An aqueous solution of hydrochloric acid was added to the latex after the peptization to give an acidic pH (pH = 5) and then, 0.5 part of 2,6-di-t-butyl-4-methyl phenol was added as an antioxidant. The unreacted monomer was removed by the steam stripping method under reduced pressure. The polymer component was coagulated by conventional freeze coagulation and was washed with water. It was dried to obtain a rubber product having a molecular weight of 320,000.

REFERENCE EXAMPLE 1

The monomer and the additives listed in Table 4 were charged into a reactor. The reaction system was purged with nitrogen gas and was maintained at 40° C. The polymerization was initiated by adding dropwise potassium persulfate. When the conversion of the monomer reached 85%, an aqueous solution of 2.0 parts of dimethyl ammonium dimethyl dithiocarbamate was added and then the pH of the latex was adjusted to about 11. An emulsion containing 2.0 parts of tetraethyl thiuramdisulfide was added to the latex. The mixture was kept at 40° C. during 5 hours for aging to perform the peptization. The emulsion was prepared by emulsifying a mixture of 2.0 parts of tetraethyl thiuramdisulfide, 5.0 parts of chloroprene, 0.25 parts of sodium laurylsulfate and 10 parts of water. After the peptization, 0.5 part of 2,6-di-t-butyl-4 -methyl phenol was added as an antioxidant. The unreacted monomer was removed by the steam stripping method under a reduced pressure. An aqueous solution of acetic acid was added to adjust the pH to 6. The polymer component was coagulated and was washed with water. It was dried to obtain a rubber polymer having a molecular weight of 360,000.

TABLE 4

|  | Monomer Emulsion Parts |
|---|---|
| Chloroprene | 100 |
| Sulfur | 0.55 |
| Emulsifier (disproportionated wood rosin) | 4.5 |
| Water | 120 |
| Sodium hydroxide | 1.0 |
| Condensates of formaldehyde-sodium naphthalene sulfonate | 0.7 |

The rubber polymers separated in Examples 1 and 2 and Reference Example 1 were kept at 70° C. for various times for heat aging. The variations in Mooney viscosities $Ml_{1-4}$ (100° C.) of the rubbers were measured by the Japanese Industrial Standard 6388. The results are shown in Table 5.

TABLE 5

| ML$_{1+4}$ (at 100° C) | Variations of Mooney Viscosities of Rubbers By Heat Aging at 70° C | | |
|---|---|---|---|
| | Reference Example 1 | Example 1 | Example 2 |
| initiation | 48 | 44 | 45 |
| 15 hours | 45 | 42 | 44 |
| 50 hours | 48 | 43 | 46 |
| 70 hours | 55 | 48 | 53 |
| 100 hours | 73 | 53 | 56 |
| 120 hours | 90 | 68 | 69 |

As is clear from the data of Table 5, the storage stability of the polymers of this invention is superior to that of the reference example.

EXAMPLE 3

The monomer and the additives listed in Table 6 were charged into the reactor. The reaction system was purged with nitrogen gas and was maintained at 40° C. The polymerization was initiated by adding dropwise at initiator (an aqueous solution of t-butyl hydroperoxide). When the conversion of the monomer reached 83%, the polymerization was terminated by adding an emulsion containing 0.01 part of 4-t-butyl catechol and 0.01 part of phenothiazine. The polymerization time was 7 hours and the gel percent before the peptization was 94.5%. A 10% aqueous solution of sodium hydroxide was added to the latex to give an alkaline pH (pH = 9) and the mixture was kept at 40° C. during 5 hours for aging to perform the peptization. An aqueous solution of acetic acid was added after the peptization to give an acidic pH (pH = 5) to terminate the polymerization. A 0.5 part sample of 2,6-di-t-butyl methyl phenol was added to the latex. The unreacted monomer and benzene were removed by the steam stripping method under a reduced pressure. A methanol solution of calcium chloride was added to the mixture to precipitate the polymer component. The polymer component was washed with hot water and further washed with a small amount of methanol and was dried to obtain a sulfur modified polychloroprene latex having relatively low molecular weight and an intrinsic viscosity at 40° C. in benzene [Λ] =0.40.

TABLE 6

| | Monomer Emulsion Parts |
|---|---|
| Chloroprene | 100 |
| Benzene | 40 |
| Sulfur | 2 |
| Emulsifier (alkylallyl benzyl trimethyl ammonium chloride) | 8 |
| Acetic acid | 0.5 |
| Condensates of formaldehyde-sodium naphthalene sulfonate | 0.7 |

REFERENCE EXAMPLE 2

The polymerization of Example 3 was repeated except for using sodium polyoxyethylenealkylallyl sulfonate instead of the emulsifier alkylallyl benzyl trimethyl ammonium chloride. A sulfur modified polychloroprene latex was obtained in a conversion of 82% for a polymerization time of 7 hours. The gel percent was 95.3%. The peptization of the latex was conducted in accordance with the process of Example 3 by adding a 10% aqueous solution of sodium hydroxide to give an alkaline pH (pH = 10) and maintaining the mixture at 40° C. during 6 hours for aging. However, the resulting polymer was insoluble in benzene.

EXAMPLE 4

A 10% aqueous solution of sodium hydroxide was added to the sulfur modified polychloroprene latex prepared in Example 3, to give a pH of 9. The peptization of the latex was performed during 1 hour and an aqueous solution of hydrochloric acid was added to give an acidic pH (pH = 5). In FIG. 1, the intrinsic viscosities of the polymer at 40° C. in benzene are shown by the full line and the intrinsic viscosities of the polymer produced with the addition of the aqueous solution of sodium hydroxide are shown by the dashed line. As is clear from FIG. 1, the peptization was immediately terminated by producing the acidic pH.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for producing sulfur modified polychloroprene polymers, which comprises:
   polymerizing chloroprene or a mixture of chloroprene and a comonomer with sulfur and a peroxide initiator in a neutral or acidic aqueous emulsion in the presence of a nitrogen containing cationic emulsifier; and then
   peptizing the resulting sulfur modified polychloroprene latex by adding a peptizing agent consisting of an alkaline aqueous solution to said latex in a quantity to adjust the pH of the latex to a value greater than 8.

2. The process of claim 1, wherein the chloroprene content in the mixture of chloroprene and the comonomer is more than 50 wt. % and said comonomer has at least one ethylenically unsaturated double bond.

3. The process of claim 1, wherein the cationic emulsifier is an ampholytic quaternary ammonium salt emulsifier.

4. The process of claim 1, wherein the peptization of the resulting sulfur modified polychloroprene latex is performed by aging the latex in a solution having an alkaline pH, and wherein the peptization is terminated by addition of an acid to adjust the pH to a neutral or acidic pH.

5. The process of claim 1, wherein 0.25-10.0 wt. % of sulfur relative to the total monomer weight is added.

6. The process of claim 1, wherein the temperature of the peptization reaction is 10°-50° C.

7. In a process for polymerizing chloroprene or chloroprene and a comonomer with sulfur catalyzed by a peroxide intitiator in an aqueous emulsion containing an emulsifier and then peptizing the polymer product obtained, the improvement comprising:
   polymerizing said reactants in a neutral to acidic aqueous emulsion in the presence of a nitrogen containing cationic emulsifier; and
   peptizing the resulting sulfur modified polychloroprene latex by adding a peptizing agent consisting of an aqueous alkaline solution to said latex in a quantity to adjust the pH of the latex to a value greater than 8.

* * * * *